April 29, 1941.  R. G. LE TOURNEAU  2,239,824
BRAKE-BAND MOUNTING
Original Filed May 5, 1939   3 Sheets-Sheet 1

INVENTOR
R. G. LeTourneau
BY
ATTORNEYS

April 29, 1941.  R. G. LE TOURNEAU  2,239,824
BRAKE-BAND MOUNTING
Original Filed May 5, 1939  3 Sheets-Sheet 2

INVENTOR
R. G. LeTourneau
BY Webster & Webster
ATTORNEYS

April 29, 1941.   R. G. LE TOURNEAU   2,239,824
BRAKE-BAND MOUNTING
Original Filed May 5, 1939   3 Sheets-Sheet 3
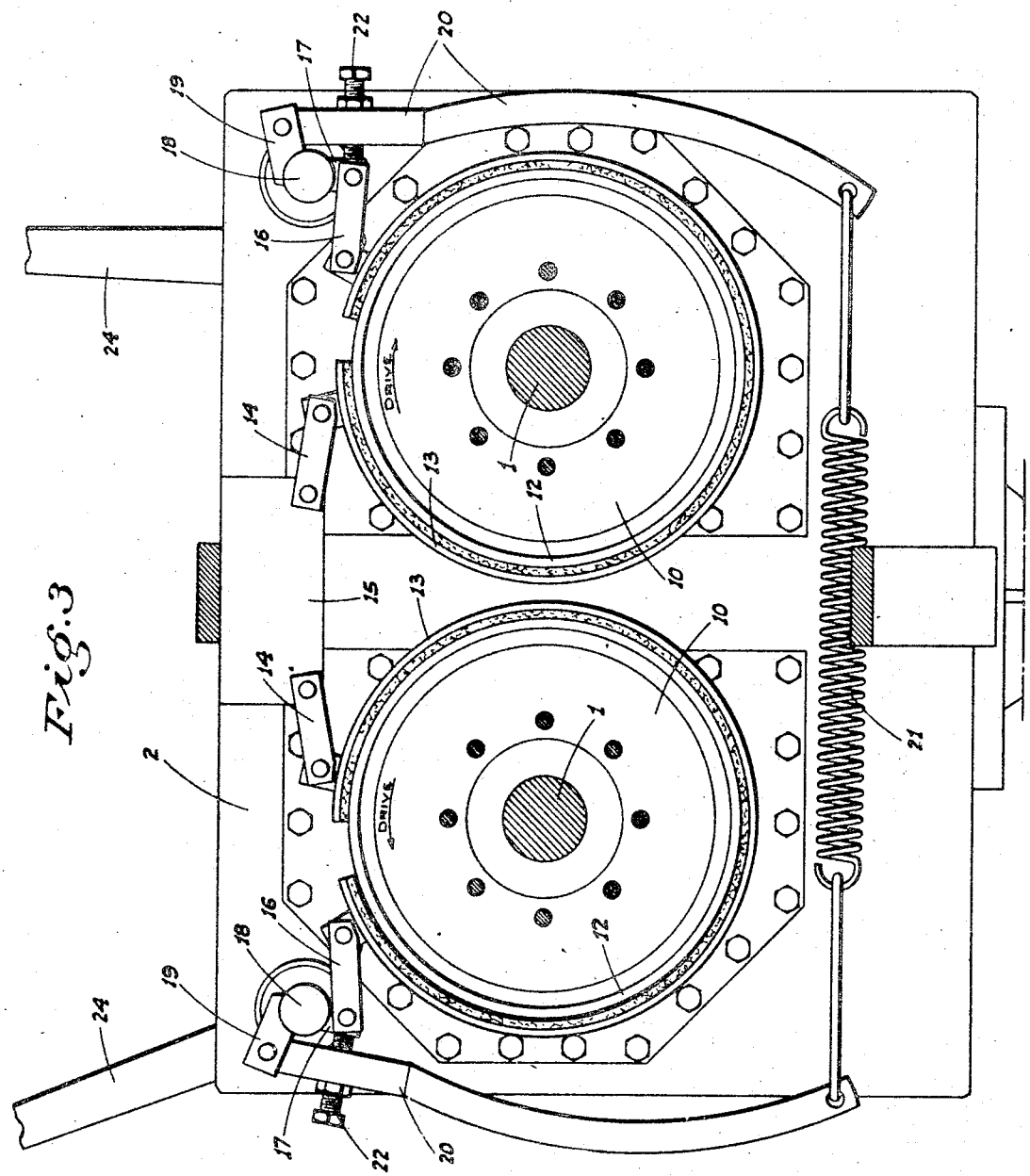
INVENTOR
R.G. LeTourneau
ATTORNEYS Patented Apr. 29, 1941

2,239,824

UNITED STATES PATENT OFFICE 2,239,824

BRAKE-BAND MOUNTING

Robert G. Le Tourneau, Peoria, Ill., assignor to R. G. Le Tourneau, Inc., a corporation Original application May 5, 1939, Serial No. 271,907. Divided and this application September 27, 1940, Serial No. 358,576

2 Claims. (Cl. 188—77)

This invention relates to power control units or power hoists, such as are mounted on tractors to control the operating cables of implements drawn by the tractors, and particularly to the brake assembly of such units; the present application being a division of my allowed application Ser. No. 271,907, now Patent No. 2,220,655, dated Nov. 5, 1940.

This invention also represents improvements over the brake mounting structure of my Patent No. 1,912,645, dated June 6, 1933.

In the present structure, as well as in the original, the band is of the self-setting type, and the principal object of this invention is to provide an improved band mounting assembly so arranged that the automatically functioning brake applying pressure may be increased or reduced quickly and easily, as wear or operating conditions may require, without affecting the full release of the band when desired, and without altering the normal setting of the clutch and brake control member.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 3 is a transverse section, looking forward, on line 3—3 of Fig. 2.

Figure 1:
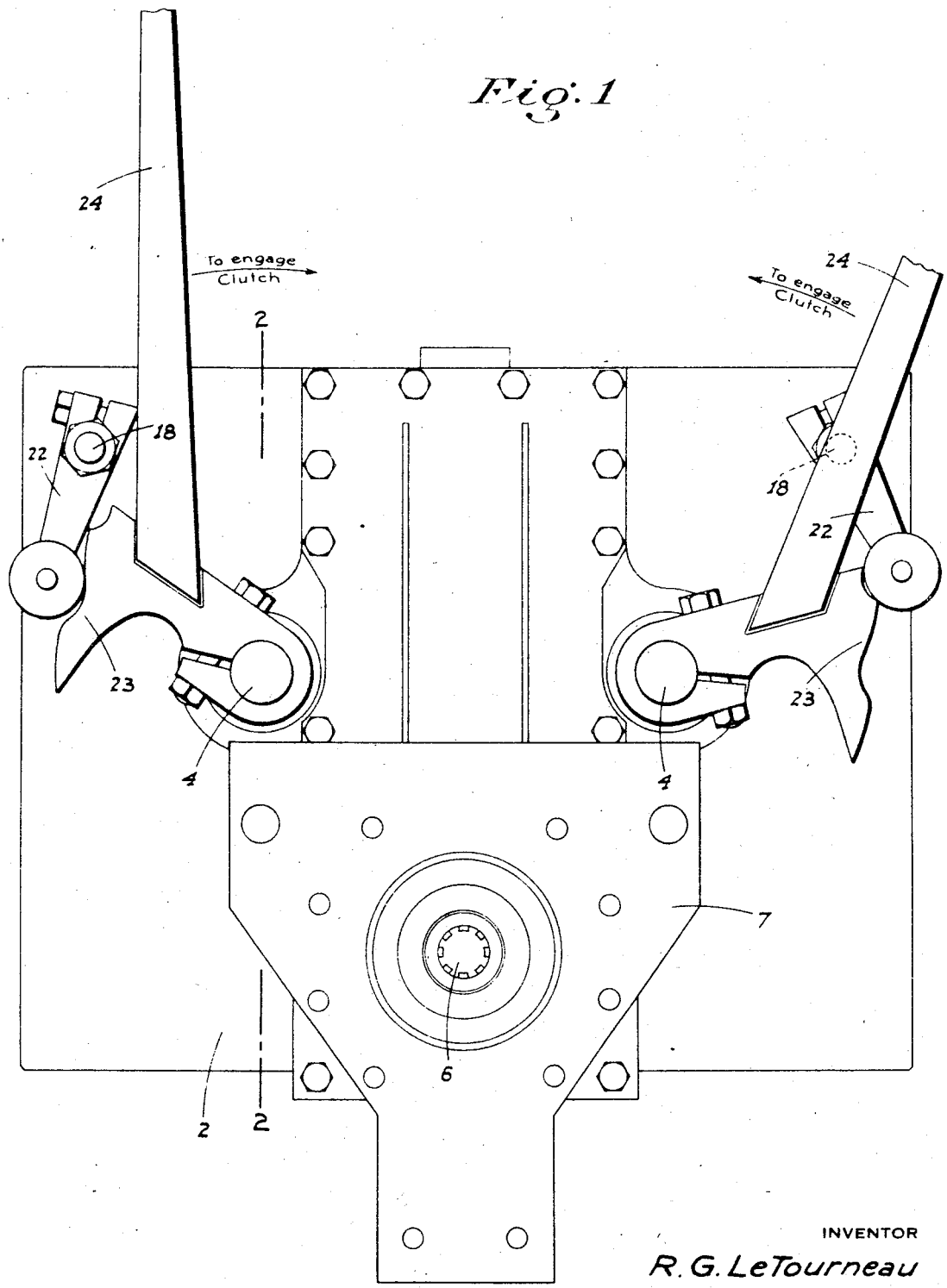
Figure 1 is a front end elevation of a two drum unit, showing the adjacent brake control parts in position with one brake set and the clutch disengaged, and with the other brake fully released and with the clutch likewise disengaged.
Figure 2:
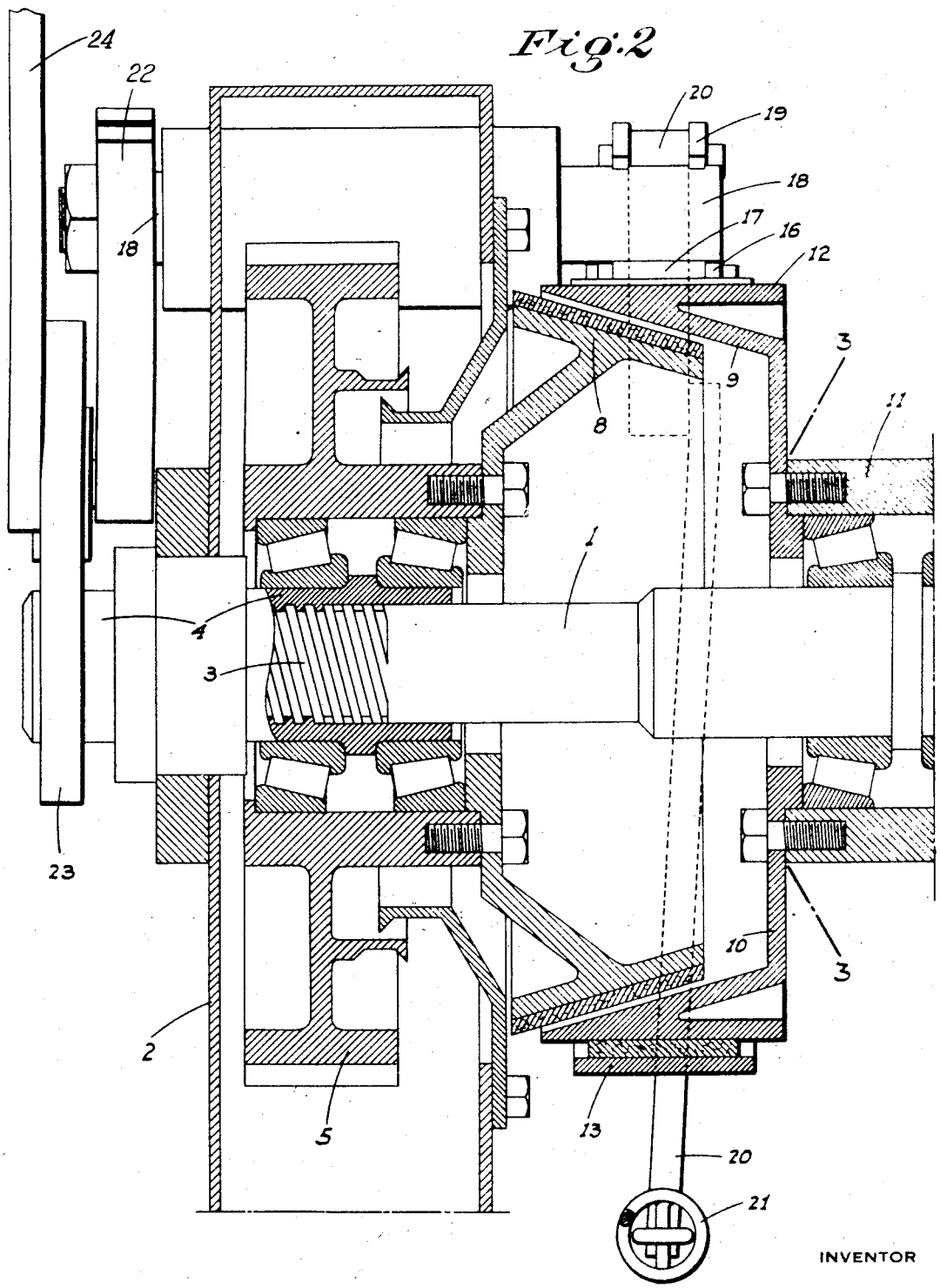
Figure 2 is a longitudinal section on line 2—2 of Fig. 1.

Referring now more particularly to the characters of reference on the drawings, the construction of the present unit in the main is substantially the same as that of Patent No. 1,912,645, and comprises a pair of fixed horizontal and transversely spaced shafts 1, which project through a fixed housing 2. Each shaft at its forward end is provided with a multiple thread 3 engaged by a rotatable tapped sleeve 4 projecting from the front end of the housing. The sleeve turnably supports a driving gear 5 within the housing. The gears of the two shafts intermesh as shown in said patent, one being gear 5 connected with a drive shaft 6 mounted in the removable neck 7 attached to the housing and adapted for connection with the take-off shaft of a tractor.

Each gear 5 has a male rearwardly facing cone clutch member 8 secured therewith and disposed rearwardly of the housing. This member cooperates with a female cone clutch member 9 having a rear end wall 10 surrounding shaft 1. This wall forms the forward cable retaining flange of the cable drum barrel 11.

A brake drum 12 is fixed rigid with and extends about the periphery of each clutch member 9, the drum 12 being engaged by a split band 13. The band at one end is connected by a link 14 with an anchor plate 15 rigid with housing 2; the link being disposed substantially tangent to the brake drum and extending therefrom in a direction opposite to the direction of driven rotation of the brake drum and clutch unit as indicated.

The other end of the band is connected to a link 16 also substantially tangent to the brake drum but extending therefrom in the direction of driven rotation of said drum. This link 16 is connected at its outer end to a short arm 17 depending from a rotary shaft 18 mounted in the housing 2 laterally out from the adjacent shaft 1 and extending through said housing.

Spaced arms 19 project laterally out from shaft 18 in planes on opposite sides of arm 17, and swively support a depending link 20 which extends clear of the outer side of the adjacent brake band to a termination below the same. At their lower ends, both links 20 are connected by a tension spring 21, although actually each link could have its own spring. An adjustment screw 22 is threaded through the link 20 and bears against the arm 20, so that upon advancing or retracting said screw, the brake applying pressure derived from spring 21 may be increased or reduced respectively, as wear or operating conditions may require. With this arrangement of parts, it will be seen that rotation of shaft 18 in a direction to pull on link 16 will positively release the brake in opposition to the spring 21.

In order to thus rotate either shaft 18 selectively in conjunction with the operation of the corresponding clutch, control mechanisms are mounted at the front end of housing 2. Each mechanism comprises a depending arm unit 22 adjustably secured on the forward end of shaft 18 and adapted at its lower end to be engaged by a cam member 23 secured on the adjacent shaft sleeve 4, and from which an operating lever 24 extends upwardly, as in said Patent No. 2,220,655.

When lever 24 is in a neutral position, or when the clutch is disengaged, the roller on arm unit 22 is free of the cam member 23, allowing shaft 18 to turn in a brake setting direction causing the brake to set itself without restraint. When lever 24 is turned in the opposite or clutch engaging direction, the cam member engages the roller on arm unit 22 and rotates shaft 18 in a direction to pull on link 16. This disengages the brake and at the same time places spring 21 under increased tension by reason of the connection of the spring mounting arm 20 with the link mounting arm 17 by screw 22.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a power control unit, a brake drum, a split band thereon anchored at one end, a link connected to the other end of the band and extending substantially tangent thereto in a direction away from said one end, a rotary brake release shaft parallel to the axis of the drum and disposed adjacent the outer end of the link, an arm rigid with and depending from the shaft on which the outer end of the link is pivoted, another link depending substantially parallel to and in lateral alinement with said arm on the side of the shaft opposite that from which the first named link projects, means pivoting said last named link in connection with the shaft, an adjustment screw mounted in said last named link and engaging the adjacent side of the arm and a spring acting on said last named link and forcing said screw against the arm.

2. A brake structure including with a brake drum, a split band thereon anchored at one end, a link connected to the other end of the band and extending substantially tangent thereto in a direction away from said one end, a rotary brake release shaft parallel to the axis of the drum and disposed adjacent the outer end of the link, an arm rigid with and projecting from the shaft on which the outer end of the link is pivoted, another link projecting in the same direction as said arm from the side of the shaft opposite that from which said first named link projects, means pivoting the last named link in connection with the shaft, a spring acting on said last named link to swing the same toward the arm, and a rigid element, adjustable as to length, between the last named link and engaging the adjacent side of the arm.

ROBERT G. LE TOURNEAU.